United States Patent [19]

Niho

[11] Patent Number: 5,043,734

[45] Date of Patent: Aug. 27, 1991

[54] DISCRETE AUTOFOCUS FOR ULTRA-HIGH RESOLUTION SYNTHETIC APERTURE RADAR

[75] Inventor: Yoji G. Niho, Rancho Palos Verdes, Calif.

[73] Assignee: Hughes Aircraft Company, Los Angeles, Calif.

[21] Appl. No.: 288,741

[22] Filed: Dec. 22, 1988

[51] Int. Cl.⁵ .............................................. G01S 13/89
[52] U.S. Cl. ..................................... 342/25; 342/162; 342/195; 342/196; 342/197
[58] Field of Search ................ 342/25, 179, 195, 197, 342/161, 162

[56] References Cited

U.S. PATENT DOCUMENTS

| | | | |
|---|---|---|---|
| 4,219,811 | 8/1980 | Herman et al. | 342/25 |
| 4,471,357 | 9/1984 | Wu et al. | 342/25 |
| 4,706,088 | 11/1987 | Weindling | 342/25 |
| 4,706,089 | 11/1987 | Weindling | 342/25 |
| 4,724,418 | 2/1988 | Weindling | 342/25 |
| 4,771,287 | 9/1988 | Mims | 342/25 |
| 4,801,939 | 1/1989 | Jones | 342/25 |
| 4,866,448 | 9/1989 | Rocca et al. | 342/25 |

Primary Examiner—Thomas H. Tarcza
Assistant Examiner—John B. Sotomayor
Attorney, Agent, or Firm—Leonard A. Alkov; Wanda K. Denson-Low

[57] ABSTRACT

The invention provides improved focus by phase corrections for Synthetic Aperture Radar images by operation on the range bin containing a selected isolated target. A phase correction signal is generated by first obtaining a non-interfering radar return from the selected target through band pass filtering operation and then extracting a non-linear residual phase from the band pass filtered data with an arc-tangent generator. The residual phase derived by the arc-tangent generator is then applied to the range compressed SAR data as a phase correction signal.

8 Claims, 3 Drawing Sheets

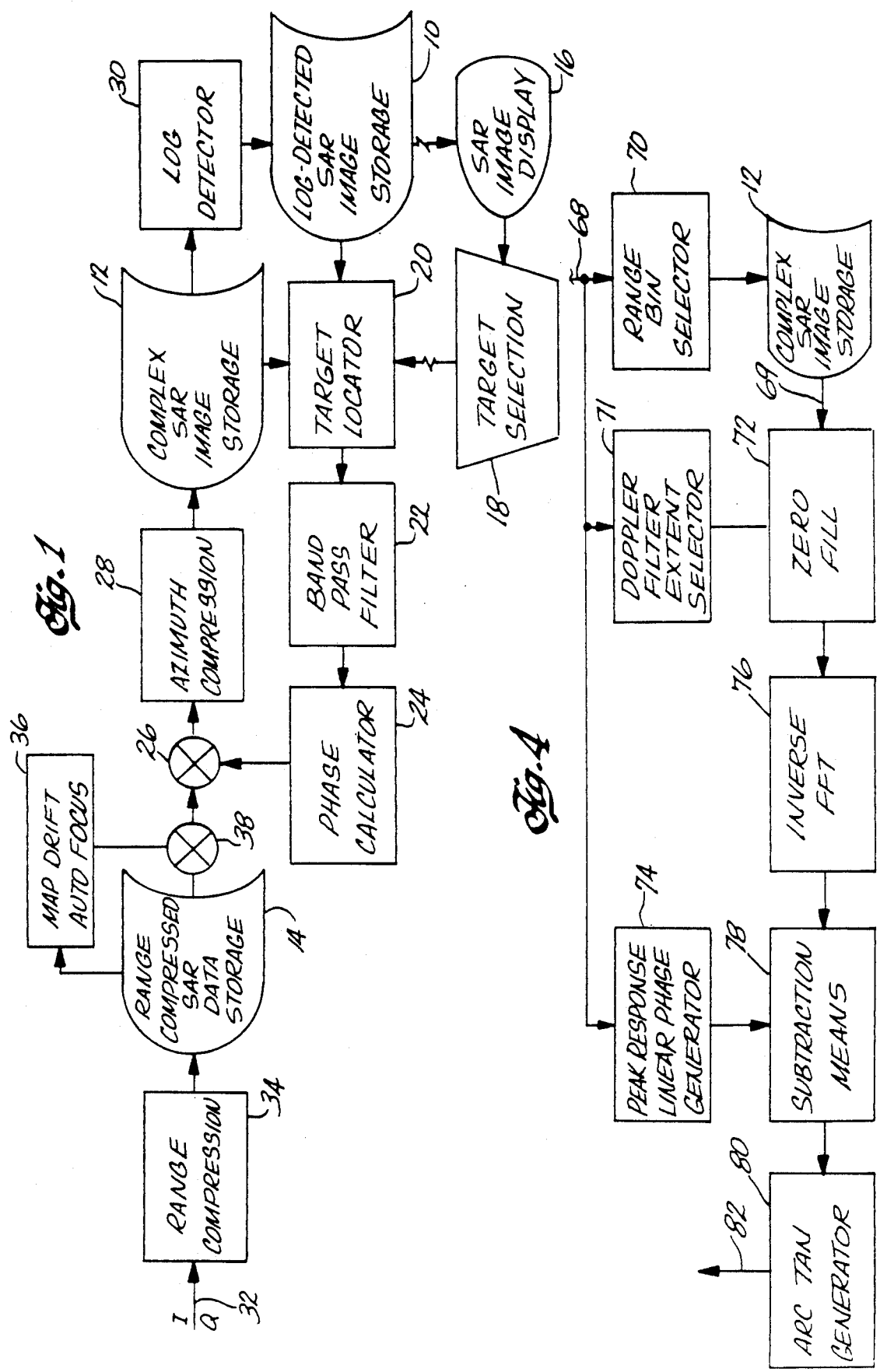

DISCRETE AUTOFOCUS FOR ULTRA-HIGH RESOLUTION SYNTHETIC APERTURE RADAR

The present invention relates generally to the field of focusing of images for ultra high resolution synthetic aperture radar. Specifically the invention provides a system and method for the extraction of phase reference data from a selected point target for focus correction of the image.

BACKGROUND OF THE INVENTION

High resolution synthetic aperture radar (SAR) is used for detail ground mapping at long range. The data array for the SAR image, which has been motion-compensated to produce the focused image, may still contain residual phase errors which result in an unfocused or smeared image. A number of effects may create this error such as turbulence, errors in the velocity or inertial platform data from the aircraft and variations in the height of ground features. However, the dominant source of error is an erroneously sensed motion of the aircraft, caused by the inherent limitation of the inertial navigation system.

An automatic estimation and compensation of the phase error has classically been obtained using several techniques. The residual phase error is assumed to be representable in terms of the second or higher order polynomial and each autofocus technique attempts to estimate the coefficients of the assumed polynomial function. This phase error estimation usually involves partitioning the SAR array into several subarrays. One example is the phase comparison method found in U.S. Pat. No. 4,219,811 to Herman et al. The Herman technique creates a vector resultant from each of three subarrays formed from the SAR array. A phase correction term is derived by comparing the phase angle of the first end subarray vector resultant with respect to the other end subarray vector resultant, bisecting the angle of the two resultants and comparing it with the phase of the central subarray resultant. Another example is the map drift autofocus method as discussed by C. E. Mancill and J. M. Swiger, published in the 27th Tri-Service Radar Symposium Records June 1981. In this method, the multiple lower resolution images are produced from subarrays and are correlated to determine the relative shift. A set of relative shifts or drifts among subarrays are then processed to yield the coefficient of the assumed polynomial.

The phase comparison method is usually used for a quadratic phase correction and has a pull-in range of approximately 180 degrees. The map drift method has a very large pull-in range and has been known to estimate the higher order phase errors reliably.

Focus corrections provided by either method described will significantly improve the SAR image, provided that the underlying phase error can be accurately represented by a polynomial. However, those methods start to break down if the actual phase error is highly non-linear and requires a very high order polynomial for its accurate representation.

One technique that is different from the techniques described above is a method where one attempts to extract the reference phase signal directly from a target in the image. However, all known techniques of this type involve the extraction of the phase data, unwrapping of the phase data to create a continuous phase function, followed by some type of a polynomial fitting.

The present invention method provides a means for extracting the phase reference data from an isolated point target using this novel approach, and at the same time eliminates the need for phase unwrapping and higher order polynomial curve fitting.

SUMMARY OF THE INVENTION

The present invention provides a means for focusing a SAR image which may be used in a stand alone mode or as a supplement to the prior existing techniques.

The nonlinear phase errors present in the SAR data creates smearing which makes recognition and identification of all targets difficult. The present invention makes use of an isolated point-scatterer-like target which provides a non-interfering radar return in the image and hence can be used as phase reference signal. The range bin containing the isolated target is identified and the resolution cells within the range bin defining the azimuth extent of the target are determined. Identification of the range bin and the doppler (azimuth) extent may be made manually by an operator viewing the SAR image or by an automated selection system. The current embodiment uses a manual selection. The corresponding range bin from the azimuth compressed complex SAR array is retrieved. The doppler filter outputs corresponding to the resolution cells covering the full extent of target are determined and the location of the peak response is determined by interpolating responses among doppler filters having the maximum responses. A band pass filter operation is performed by setting to zero each of the filters that are outside the frequency extent of the target and taking an inverse Fast Fourier Transform. The linear phase progression corresponding to the interpolated peak response in the doppler filter bank is then removed from the band-pass filtered range bin data. A residual phase is then calculated for each time sample of the linearized band-pass filtered range bin by computing the arc tangent of the time sample. The array of range compressed SAR data corresponding to the SAR image prior to azimuth compression is retrieved. The residual phase as calculated from the band-pass filtered range bin is then subtracted from each range bin in the range compressed array. Azimuth compression is performed on this revised SAR data and a new SAR image is formed.

The new SAR image is then assessed for smear correction. If significant errors still remain in the image as presented, an additional isolated target is selected and the process is repeated for the new target. Corrections to the data may be cumulative by using the newly formed SAR image or the data corresponding to the original image may be used as a clean retry. This process may be repeated until satisfactory resolution on the SAR image can be obtained.

BRIEF DESCRIPTION OF THE DRAWINGS

FIG. 1 is a schematic representation of the individual elements of the invention;

FIG. 4 is a schematic representation of detail expanding the target selection, location, band pass filter and phase extraction elements of FIG. 1.

DETAILED DESCRIPTION OF THE PREFERRED EMBODIMENTS

Figure 3:
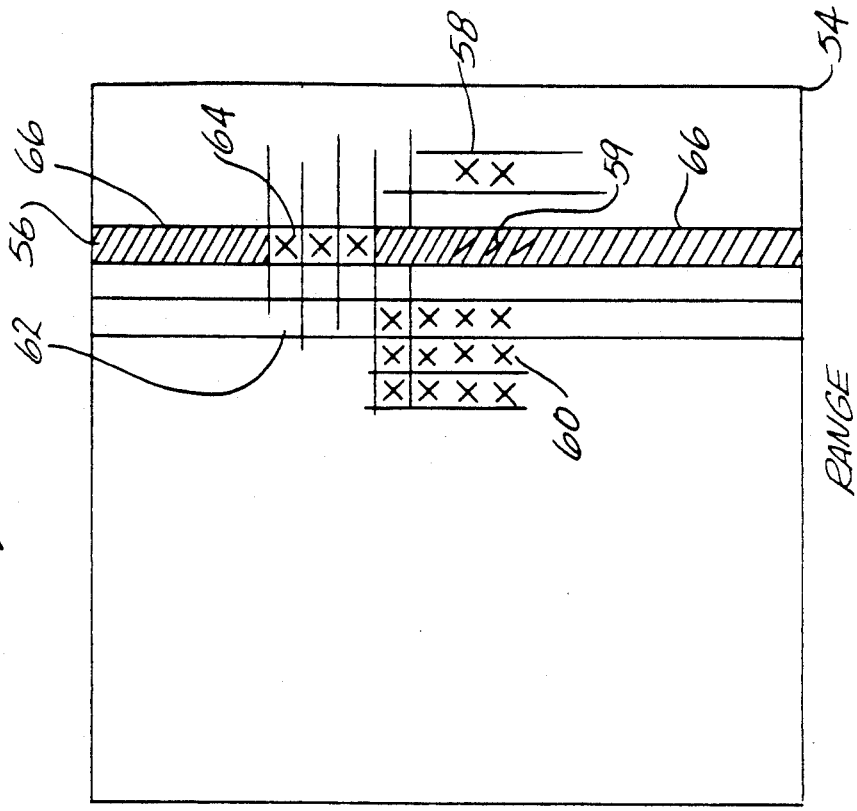
FIG. 3 is a pictorial representation of the complex number data array corresponding to the SAR image shown in FIG. 2.

The invention as described in the specification comprises software subroutines for incorporation in a general purpose computer or in a standard programmable signal processing unit such as the Hughes Emitter Coupled Logic Programmable Signal Processor (ECL PSP). Those skilled in the art will recognize that the individual elements of the invention may be provided in software or reduced to hard wired circuitry for speed or other design considerations.

Referring to FIG. 1, a first embodiment of the invention is demonstrated in block diagram form. Storage means for the log-detected SAR image and for the corresponding complex-valued SAR image are provided. The memory storage for the log-detected SAR image and the complex SAR image may be a single contiguous memory unit or may be individual dedicated memory units, depending upon the physical embodiment of the invention. The representation shown in FIG. 1 provides for three distinct storage elements. The first storage means acts as a log-detected SAR image storage 10. The second storage means holding complex-valued data is the complex SAR image storage 12 and the data representing the SAR data prior to azimuth compression is stored in the third storage means, range-compressed data storage 14. A SAR image display 16 is provided for viewing the image. Target selector 18 is provided for selecting an isolated target from the SAR image display. The identification of the target in the present embodiment is made by a technician viewing the SAR image on the display 16. The display may have a grid format or other means to allow the technician to visually determine the range bin of the target which will be more fully described later using FIG. 2. The identification of the range bin for the isolated target provides a cue for location of the image in the SAR image storage 10 and a corresponding complex SAR image available in the complex SAR image storage 12. A target locator 20 is provided to identify the range bin containing the isolated target in the complex SAR image storage 12, and to determine the doppler extent of the target and the location of the interpolated peak response of the target. If there is more than one isolated target in the SAR image, the target having the highest peak response is normally selected. The range bin containing the identified target is retrieved from the complex SAR image storage 12 and is then operated on by a band pass filter 22. Filters outside of the doppler extent of the target as determined by the target locator 20 are set to zero and the inverse Fast Fourier Transform is performed to produce the band pass filtered data. A phase calculator 24 is provided to operate on the data output from the band pass filter 22. The linear phase progression corresponding to the interpolated peak response is then subtracted from the data, leaving the band pass filtered range bin with only non-linear residual phase errors. A residual phase error is then determined by the phase calculator 24 by calculating the arc tangent of the phaser in each time sample of the linearized band pass filtered range bin. A standard multiplier 26 is provided for incorporating the residual phase correction into the range compressed SAR data prior to azimuth compression. Calculation of the arc-tangent $\phi_n$ of the phaser in each time sample of the linearized band pass filtered range bin provides a residual phase which may then be incorporated in a phase error correction phasor $e^{-j\phi}n$, n=1, ..., N, N equalling the number of time samples in the range bin. The multiplier 26 incorporates this phase error correction in each corresponding time sample of each range bin in the range compressed data storage 14. The resulting array is then subjected to azimuth compression 28 and a log detector 30 recreates the SAR image restoring an image corrected for residual phase errors in the image storage 10. A new image is then projected to the SAR image display 16.

The embodiment of the invention as shown may operate either on data which has only been range compressed or on data which has been subjected to an initial focusing. Integrated in-phase and quadrature phase data is received on input 32. The data is subjected to a range compression 34. A means for autofocusing may be employed to provide initial focusing of the data. In the preferred embodiment of the invention a map drift autofocus 36 is used. Phase error corrections determined by the map drift autofocus 36 are multiplied into the range compressed data using a standard multiplier 38 prior to an azimuth compression 28.

Figure 2:
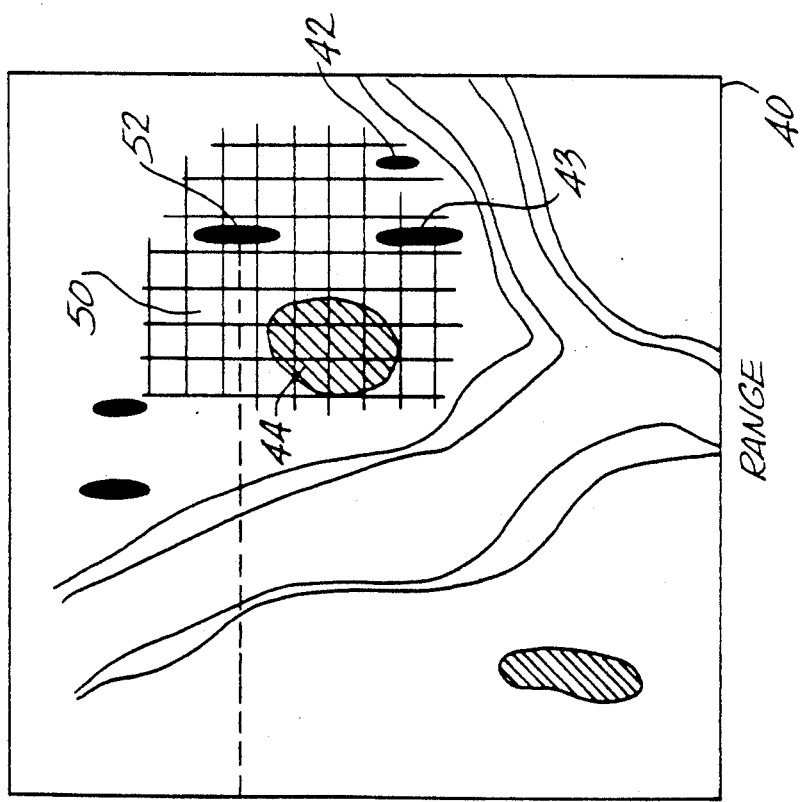
FIG. 2 is a pictorial representation of the displayed SAR image with smearing of targets including point scatterers and group scatterers.

Referring now to FIG. 2, a representation of a SAR image 40 is shown. The SAR image will contain multiple isolated targets 42, 43, 52, and grouped targets 44. The SAR image is comprised of a two dimensional array of range bins 46 and azimuth or doppler filters 48. The intersection of a range bin and azimuth filter forms a resolution cell 50. An isolated target 52 is selected as previously described. The range bin 46 where the target is located is defined. As shown, the range bin 46 contains two isolated targets, 43 and 52.

FIG. 3 portrays the corresponding complex SAR image. The complex number array 54 is also comprised of range bins and azimuth filters which have a one to one correspondence with the range bins and azimuth filter of the SAR image 40. The range bin 56 corresponds to the range bin 46 of the SAR image. Complex number representations of individual targets 58, 59, 64 and group targets 60 also reside in the data array. The individual resolution cells of the SAR image 50 are represented in the complex number array as complex valued range bin and doppler filter outputs 62. The selected target 52 in the SAR image is smeared over several resolution cells. These resolution cells correspond with a doppler filter extent 64 of the target in the complex number array. The band pass filter 22 of FIG. 1 is performed responsive to the doppler extent 64 of the target. Filters 66 outside of the doppler extent of the target are set to zero in the band pass filter operation 22 and the inverse Fast Fourier Transform is performed to produce the band pass filtered range bin. The band pass filtered range bin will then contain phase data of the target 52 only. Phase data from the target 43 are filtered out.

The complex number array containing the SAR data after a range compression but prior to azimuth compression is of a similar form to the complex SAR image. This array is maintained in the third storage means 14 of FIG. 1. Range bins in the range compressed complex SAR data correspond on a one to one basis with the range bins in the azimuth compressed complex SAR image. The range bin in the complex SAR data is a Fast Fourier Transform of the same range bin in the range compressed SAR data with the amplitude weighting and the phase error correction phasor applied. Each of the range bins in the range compressed SAR data contains time samples which are operated on during the azimuth compression to provide the doppler filter outputs of the azimuth compressed SAR image.

Referring now to FIG. 4, selection of the isolated target may be accomplished by a manual means such as an operator viewing the SAR image on the SAR image display 16 of FIG. 1 and selecting the desired target by entering range bin and azimuth filter on the keyboard or by using a light pen, touch sensitive screen or other appropriate means. This selection is provided on input 68 in FIG. 4. The range bin and resolution cells of the target in the SAR image as stored in the log-detected SAR image storage 10 of FIG. 1 are provided to a range bin selector 70, for determination of the corresponding range bin 69 in the complex SAR image storage 12. The doppler filter extent selector 71 operates on the target to select the resolution cells covered by the target in the log-detected SAR image. As previously described the range bin selector 70 and Doppler filter extend selector 71 may be manually synthesized by a technician typing in SAR coordinates from the SAR Image Display 16. Doppler filters of the FFT which are outside the filter extent of the target are set to zero by zero fill 72. The data is then operated on by an inverse FFT to produce a band pass filtered range bin. A linear phase generator 74 is provided to determine the linear phase progression corresponding to the peak response. A subtraction means 78 operates on the band pass filtered range bin data to remove the linear phase progression determined by the peak response linear phase generator 74. The linearized band pass filtered range bin is now operated on by an arc-tangent generator 80 which determines the residual phase of each phasor in the range bin. The arc-tangents $\phi_n$ at output 82 are then provided to the phase calculator 24 to produce the phase correction phasor $e^{-j\phi_n}$ for subsequent phase correction operation on the corresponding time samples of each range bin in the range compressed SAR data storage 14 by the multiplier 26 of FIG. 1.

The first embodiment of the invention as shown in FIGS. 1 and 4 assumes that the memory storage is provided for the log-detected SAR image 10, the complex SAR image 12 and the range compressed SAR data 14. Since SAR images are typically of large size, saving all 3 sets of arrays puts enormous burden on the memory requirements for implementing the discrete autofocus.

In the first embodiment, an input to the band pass filter operation for producing a phase correction phasor is an azimuth compressed range bin retrieved from the complex SAR image storage 12 as shown in FIG. 4. Typically, however, only a small number of range bins are involved during the selection of the best phase correction phasor, and those azimuth compressed range bins are easily recreated from the corresponding range bin from the range compressed SAR data storage 14.

Figure 5:
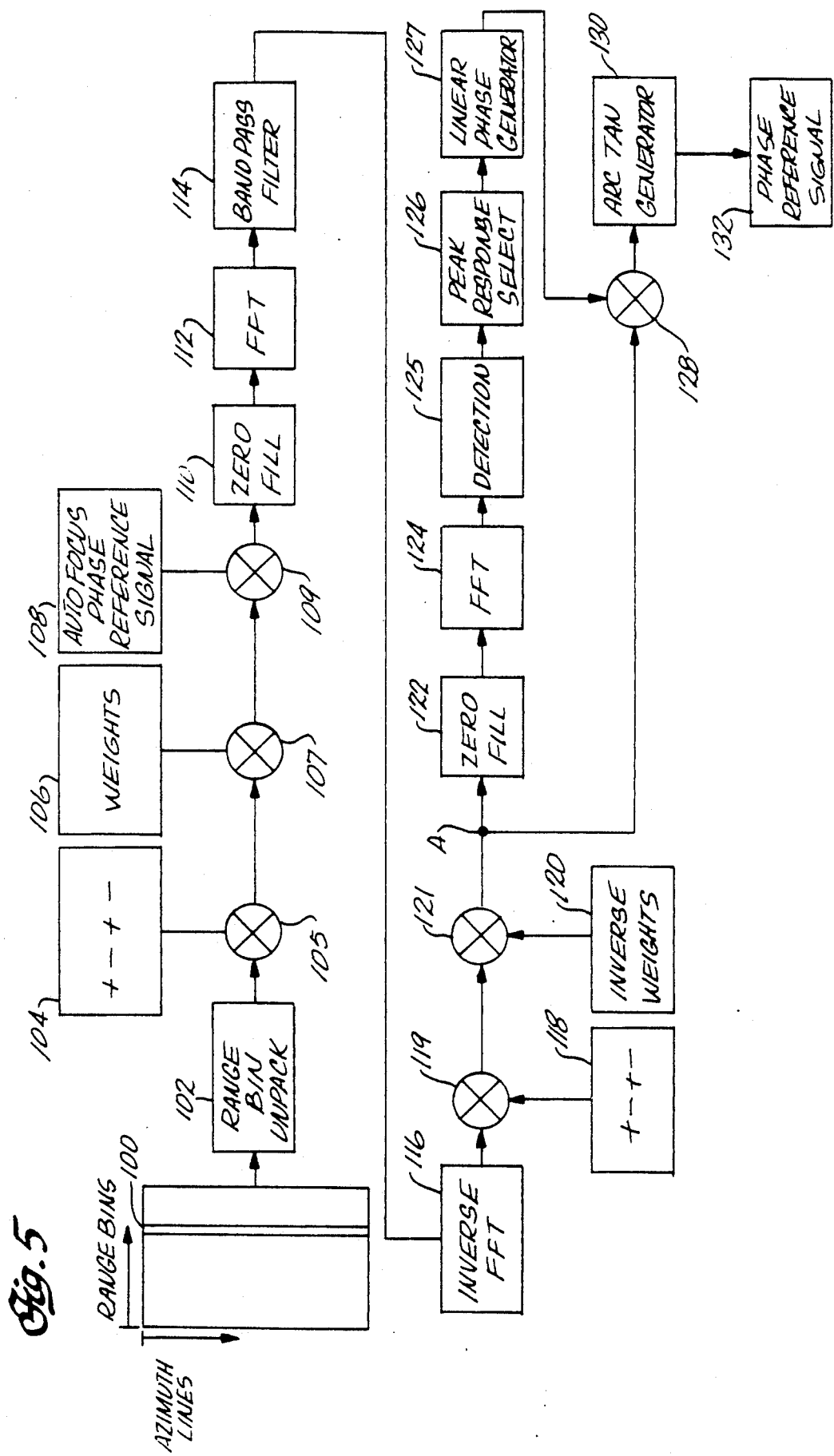
FIG. 5 is a schematic representation of a second embodiment of the invention.

The second embodiment of the invention assumes that the memory storage is provided only for the log-detected SAR image 10 and the range compressed SAR data 14. The band pass filter operation under the second embodiment is depicted in FIG. 5. As shown, the input to the band pass filter operation is retrieved from the corresponding range bin from the range compressed SAR data storage 14.

The range compressed data storage 14 comprises range bins and azimuth lines corresponding to the SAR image of FIG. 2 as previously described. The range bin 100 containing the isolated target has been selected as described in the first embodiment. Range bin 100 comprises a sequence of time samples corresponding to the selected range bin in the SAR image of FIG. 2. In this embodiment the data array in range bin 100 is stored in the range compressed data storage 14 as signed finite precision integers. Range bin 100 is therefore subjected to range bin unpacking 102 for conversion of the data array to complex number values. An alternating sign operator 104 is applied to the unpacked range bin data by multiplier 105. Weights 106 developed by standard techniques for side lobe suppression are then applied to the data array by multiplier 107. An autofocus phase reference signal 108 operates on the data array through multiplier 109. In the preferred embodiment, the autofocus phase reference signal is generated using a standard map drift autofocus technique. The data array of the range bin 100 is then subjected to a zero fill 110 to extend the array size to match the size of the FFT 112. After the data array of range bin 100 passes through the FFT 112, a band pass filter operation 114 is performed by setting all FFT filters which lie outside of the filter extent of the isolated target, as previously described, to zero, and subjecting the data array to an inverse FFT 116. The output from the inverse FFT is then subjected to an alternating sign operator 118 through multiplier 119. The weights 106 which were previously applied to the data array are now removed by operating on the data array with inverse weights 120 through multiplier 121. At point A a band pass filtered range bin is present and is then subjected to a second zero fill 122 for matching to a second FFT 124 of a larger size. The data array is then operated on by FFT 124 followed by a detection 125, a peak response select 126, and a linear phase generator 127. A linear phase generator 127 generates the linear phase corresponding to the peak filter of the FFT 124. The phase, $_n$, determined by the linear phase generator 127 is placed in the form $e^{-j}$ $_n$ which operates on the band pass filtered data array present at point A through multiplier 128. The data array now corrected for the linear phase progression is provided to arc-tangent generator 130 which determines the residual phase on the phasor present in each element of the array by calculating the arc-tangent $\phi_n$ of the phasor. The residual phase $\phi_n$ for each element of the data array is then used to create a phase reference signal 132 of the form $e^{-j\phi_n}$. The phase reference signal 132 may then be applied to the range compressed data as previously described and a corrected SAR image regenerated.

The computer subroutines shown in Appendix A demonstrate a software implementation of the second embodiment of the invention. In the software given in Appendix A, in-phase and quadrature components of the range compressed SAR data are represented as signed 12 bit integers.

Having now described the invention in accordance with the requirements of the patent statutes, those skilled in this art will have no difficulties making changes and modifications in &.he embodiment of the individual elements of the invention in order to meet specific requirements or conditions. Such changes and modifications may be made without departing from the scope and spirit of the invention as set forth in the following claims.

APPENDIX A

```fortran
C*******************************************************************
      SUBROUTINE discrete_autofocus( a1, a2, phasor, scalar1,
     +                               scalar2, nazl, nrgb, tot_filters,
     +                               rgb, f1, f2, az_flag )

C*******************************************************************

C    PURPOSE:  This subroutine either creates or reads in a phase
C              reference signal used for discrete autofocus.

C    SUBROUTINES CALLED:  genwts              ( genwts.for )
C                         vax_fft             ( vax_fft.for )

C    INPUTS:   nazl           - number of azimuth lines
C              nrgb           - number of range bins per subswath
C              a1             - packed VPH data (first subswath)
C              a2             - packed VPH data (second subswath)
C              phasor         - phase reference signal
C              scalar1        - adaptive scalar for first subswath
C              tot_filters    - number of filters after azimuth FFT
C              scalar2        - adaptive scalar for second subswath
C              rgb            - range bin number used for discrete
C                               autofocus
C              f1             - top doppler filter
C              f2             - bottom doppler filter C    OUTPUTS:  phase_array    - reference signal obtained from
C                               a discrete reference target
C              phasor         - updated phase reference signal C Variable Declarations Implicit None INTEGER*4    nazl, nrgb
      INTEGER*4    a1(nazl,nrgb), a2(nazl,nrgb), az_flag, dir
      INTEGER*4    f1, f2, fftsize, i, j, k, m11, m12, mask
      INTEGER*4    max_index, nbits, nf1, nf2, nq, offset, p16, rgb
      INTEGER*4    stat, str$upcase, tot_filters REAL*4       mag, max_mag, pi, phase_array(nazl), twopi
      REAL*4       scalar1(nazl), scalar2(nazl), wts(nazl)
      REAL*4       x1, x2, xi, xp, xq, y1, y2

COMPLEX*8    array(fftsize), b(fftsize), xk, phasor(nazl)

CHARACTER    batch, form, reply, type
      CHARACTER*30 filin, outfile

C-------------------------------------------------------------------
```

```
10      format(a1)
20      format(a20)

C FFT size fftsize = 4096
        nq      = 12

C Single spot offsets if ( az_flag .eq. 1 ) then
           offset = 0
        else if ( az_flag .eq. 2 ) then
           offset = 1376
        else
           offset = 688
        end if C Declaration of variables used for unpacking the range bin data nbits = 16
        p16   = 2**16
        mask  = 2**16 - 1
        m11   = 2**( nbits - 1 ) - 1
        m12   = 2**( nbits )

C Inquire whether to create a phase reference signal or to read in an
C existing phase reference signal write(6,50)
50      format(/ ' 1) Use Reference Signal or 2) Read Input File > ' $)
        read(5,10) type if ( type .ne. '1' .and. type .ne. '2' ) return C CREATING a phase reference signal if ( type .eq. '1') then C Inquire which range bin contains a discrete scatterer 65      write(6,70)
70      format(/ ' <ENTER> Range Bin Number to Extract Phase > ' $ )
        read(5,*) rgb if ( rgb .lt. 1 .or. rgb .gt. 2*nrgb ) then
            write(6,*) ' * Improper Input for Range Bin Number *'
            go to 65
        end if C Inquire the top and bottom doppler filter to use during the band pass
C filtering write(6,80) tot_filters
80      format( ' <ENTER> Top Doppler Filter (1 - ', i4, ') > ', $ )
        read(5,*) nf1
        write(6,90) tot_filters
90      format( ' <ENTER> Bottom Doppler Filter (1 - ', i4,
     +              ') > ', $ )
        read(5,*) nf2
        f2  = nf2
        nf2 = nf2 + offset
```

C Create sidelobe suppression weights call genwts( wts, nazl )

C Input data is packed as signed 12-bit integers

C Unpack range bin data do j = 1, nazl, 1 k = j
           if ( rgb .le. nrgb ) then xi = iand( a1( j, rgb ), mask )
              xq = a1( j, rgb ) / p16
              if ( xi .gt. m11 ) xi = xi - m12
              if ( xq .gt. m11 ) xq = xq - m12
              xk = scalar1( j ) * cmplx(xi,xq) / 2048.0
              array(k) = xk * (-1)**( k - 1 ) * wts(k) *
     +                   phasor(j)

else xi = iand( a2( j, rgb - nrgb ), mask )
              xq = a2( j, rgb - nrgb ) / p16
              if ( xi .gt. m11 ) xi = xi - m12
              if ( xq .gt. m11 ) xq = xq - m12
              xk = scalar2( j ) * cmplx(xi,xq) / 2048.0
              array(k) = xk * (-1)**( k - 1 ) * wts(k) *
     +                   phasor( j )

end if end do

C Zero fill tail-end of range bin to size of fft do j = nazl + 1, fftsize, 1
           array(j) = cmplx( 0.0, 0.0 )
        end do C Perform narrow band filtering on this range bin.

C    Perform forward FFT dir = 1
        call vax_fft( array, nq, fftsize, dir )

do j = 1, fftsize, 1
           else
              array(j) = cmplx( 0.0, 0.0 )
           end if end do C    Perform inverse FFT dir = -1
        call vax_fft( array, nq, fftsize, dir )

C   Remove weights

```
        do j = 1, nazl, 1
            array(j) = array(j) * (-1)**( j - 1 ) / wts(j)
            b(j)     = array(j)
        end do
```

C   Zero fill tail-end

```
        do j = nazl + 1, fftsize, 1
            array(j) = cmplx( 0.0, 0.0 )
        end do
```

C   Perform forward FFT

```
        dir = 1
        call vax_fft( array, nq, fftsize, dir )
```

C Find the maximum magnitude and its location index

```
        max_mag = 0.0
        max_index = 0
        do j = 1, fftsize, 1
           mag = cabs( array( j ) )

if ( mag .gt. max_mag ) then
              max_mag = mag
              max_index = j
           end if end do if ( max_index .eq. 0 ) stop
   +        ' * Index Not Found - Zero Mag. * '
        if ( max_index .le. fftsize / 2 ) then
           max_index = max_index - 1
        else
           max_index = max_index - ( fftsize + 1 )
        end if
```

C Notify user as to where the maximum occured

```
            write(6,100) max_index
100         format(/ ' *** Max Index of FFT = ', i5, ' ***' )
            write(6,110)
110         format(/ ' Write Phase Corrections to a File (Y/N) ' $ )
            read(5,10) reply stat = str$upcase( reply, reply )
```

C If phase corrections are to be written to disk, inquire name of output
C file and its format

```
            if ( reply .eq. 'Y' ) then
               write(6,120)
120            format(/ ' <ENTER> Name of Output File (A30)        > ' $)
               read(5,20) outfile
               write(6,130)
130            format( ' <ENTER> 0 - Formatted or 1 - Unformatted > ' $)
               read(5,*) k
               write(6,140)
140            format( ' <ENTER> R - Radians or C - Cycles         > ' $)
               read(5,10) form
```

```
C Open phase correction file if ( k .eq. 0 ) then
                 open ( unit = 33, name = outfile, type = 'new' )
              else
                 open ( unit = 33, name = outfile, type = 'new',
     +                  form = 'unformatted' )
              end if end if C Compute reference signal twopi = 8.0 * atan2( 1.0, 1.0 )
           pi    = 4.0 * atan2( 1.0, 1.0 )
           xp    = -twopi * float( max_index ) / float( fftsize )

do j = 1, nazl, 1 x1 = real( b(j) )
              x2 = aimag( b(j) )
              y1 = cos( xp * float(j) )
              y2 = sin( xp * float(j) )
              phase_array(j) = atan2( x1*y2 + x2*y1, x1*y1 - x2*y2 )

C Write phase corrections to disk if ( reply .eq. 'Y' ) then if ( k .eq. 0 ) then
                    if ( form .eq. 'R' ) write (33,*) phase_array(j)
                    if ( form .eq. 'C' ) write (33,*) phase_array(j) /
     +                                                          twopi else
                    if ( form .eq. 'R' ) write (33) phase_array(j)
                    if ( form .eq. 'C' ) write (33) phase_array(j) /
                 end if end do if ( reply .eq. 'Y' ) close ( unit = 33 )

C READING in phase correction file else if ( type .eq. '2' ) then 200        write(6,210)
210        format( / ' <ENTER> Name of Input Phase Corrections File ',
     +                    ' (A30) > ' $ )
           read(5,20) filin write(6,220)
220        format( ' <ENTER> 0 - Formatted, 1 - Unformatted > ' $ )
           read(5,*) k if ( k .eq. 0 ) then
              open( unit = 33, name = filin, type = 'old', readonly,
     +               err = 200 )
           else
              open( unit = 33, name = filin, type = 'old', readonly,
     1               form = 'unformatted', err = 200 )
           end if
```

```
         do i = 1, nazl, 1
            if ( k .eq. 0 ) then
               read( 33, *, err=230, end=230 ) phase_array(i)
               go to 250
            else
               read( 33, err=230, end=230 ) phase_array(i)
               go to 250
            end if
         end do 230      write (6,240)
240      format(/ ' * Error Reading File - Hit <RETURN> * ' )
         read(5,10) reply
         return 250      continue
         close ( unit = 33 )

end if do j = 1, nazl, 1
         k = j
         xk = cmplx( cos( phase_array(k) ), -sin( phase_array(k) ) )
         phasor( j ) = phasor( j ) * xk
      end do return
      end
```

What is claimed is:

1. A system for automatically focusing a synthetic aperture radar image having multiple, isolated and grouped targets, the image expressed as range compressed SAR data, a log-detected SAR image and a corresponding complex SAR image, the system comprising:
   (a) means for storing the range compressed SAR data, the log-detected SAR image and the corresponding complex SAR image;
   (b) means for selecting an isolated target from the log-detected SAR image and the corresponding complex SAR image;
   (c) a band pass filter responsive to the selecting means to operate on the corresponding complex SAR image thereby filtering all signals other than the isolated target to produce band pas filtered range bin data;
   (d) calculation means receiving the band pass filtered range bin data for determining a non-linear residual phase of the isolated target; and
   (e) means for incorporating the non-linear residual phase corrections into the range compressed SAR data whereby azimuth compression will then produce a well focused SAR image.

2. A system as defined in claim 1 in which the storage means comprises:
   (a) first storage means for the log-detected SAR image;
   (b) second storage means for the azimuth compressed complex SAR image; and
   (c) third storage means for the range compressed SAR data prior to azimuth compression.

3. A system as defined in claim 2 in which the identification means comprises:
   (a) first selection means for manually selecting an isolated target in the log-detected SAR image and identifying that target in the first storage means; and
   (b) second selection means responsive to the first selection means to identify the isolated target in either the second or the third storage means.

4. A system as defined in claim 3 in which the calculation means comprises:
   (a) evaluation means for determining the peak doppler filter and the associated linear phase;
   (b) first means for performing an inverse Fast Fourier Transform;
   (c) second means for subtracting the linear phase progression; and
   (d) third means for calculating the arc tangent of the resultant to provide residual phase.

5. A system as defined in claim 1 further comprising means for initial focusing of range compressed SAR data.

6. A system for automatically focusing a SAR image having multiple, isolated and grouped targets the image expressed as range compressed SAR data, a log-detected SAR image and a corresponding complex SAR image, the system comprising:
   (a) first storage means for the log-detected SAR image having a plurality of separable first range bins and azimuth filters, the intersection of a range bin and an azimuth filter defining a resolution cell;
   (b) second storage means for the azimuth compressed complex SAR image having second range bins in one to one correspondence to the first range bins and doppler filter outputs in one to one correspondence with the resolution cells;

(c) third storage means for the range compressed SAR data corresponding to the SAR image having third range bins in one to one correspondence with the second range bins, each of the third range bins having complex number time samples.

(d) first selection means to select the resolution cells of an isolated target in the SAR image;

(e) second selection means responsive to the first selection means to select the range bin and proximate first doppler filter outputs of the isolated target;

(f) a band pass filter operation of second doppler filters responsive to the second selection means;

(g) an evaluation means to determine the peak second doppler filter output and corresponding linear phase progression;

(h) first calculation means for performing an inverse FFT on the second doppler filter outputs;

(i) second calculation means for subtracting the linear phase progression;

(j) third calculation means for determining residual phase by calculating the arc tangent;

(k) fourth calculation means for subtracting the residual phase from the corresponding complex number time sample in each of the third range bins; and (l) means for reforming and storing the SAR image on the first storage means.

7. A method for focusing a SAR image having multiple isolated and grouping targets comprising:

(a) storing the log-detected SAR image and the corresponding complex SAR image;

(b) selecting an isolated target from the log-detected SAR image and the corresponding complex SAR image;

(c) filtering the corresponding range bin from the SAR image with a band pass filter to remove all signal other than that isolated target;

(d) calculating the peak doppler filter linear phase and residual phase angle of the isolated target; and (e) incorporating the non-linear residual phase corrections into the range compressed SAR data prior to azimuth compression to produce a well focused SAR image.

8. A method for focusing a SAR image having multiple, isolated, and grouped targets comprising:

(a) selecting an isolated target;

(b) determining the target range bin and resolution cells encompassing the target;

(c) determining the target doppler filters corresponding to the resolution cells;

(d) performing a band pass filter operation to obtain time samples of radar return from only the isolated target where a band pass filtering operation is realized by first performing a forward FFT, zeroing all FFT filters outside of the extent of the target, and performing an inverse FFT;

(e) operating the band pass filtered range bin to form doppler filters with a finer filter spacing by performing an FFT with a large size;

(f) determining the peak filter in the doppler filter bank having a finer filter spacing;

(g) generating the linear phase progression corresponding to the peak filter;

(h) subtracting the linear phase from the band pass filtered range bin;

(i) calculating the arc tangent of the linearized band pass filtered range bin to determine the non-linear residual phase;

(j) subtracting the non-linear residual phase from the range compressed SAR data; and (k) reforming the SAR image.

* * * * *